H. ANDERSON & J. F. HOUGHTON.
Broom-Handle Sockets.
No. 148,278. Patented March 10, 1874.
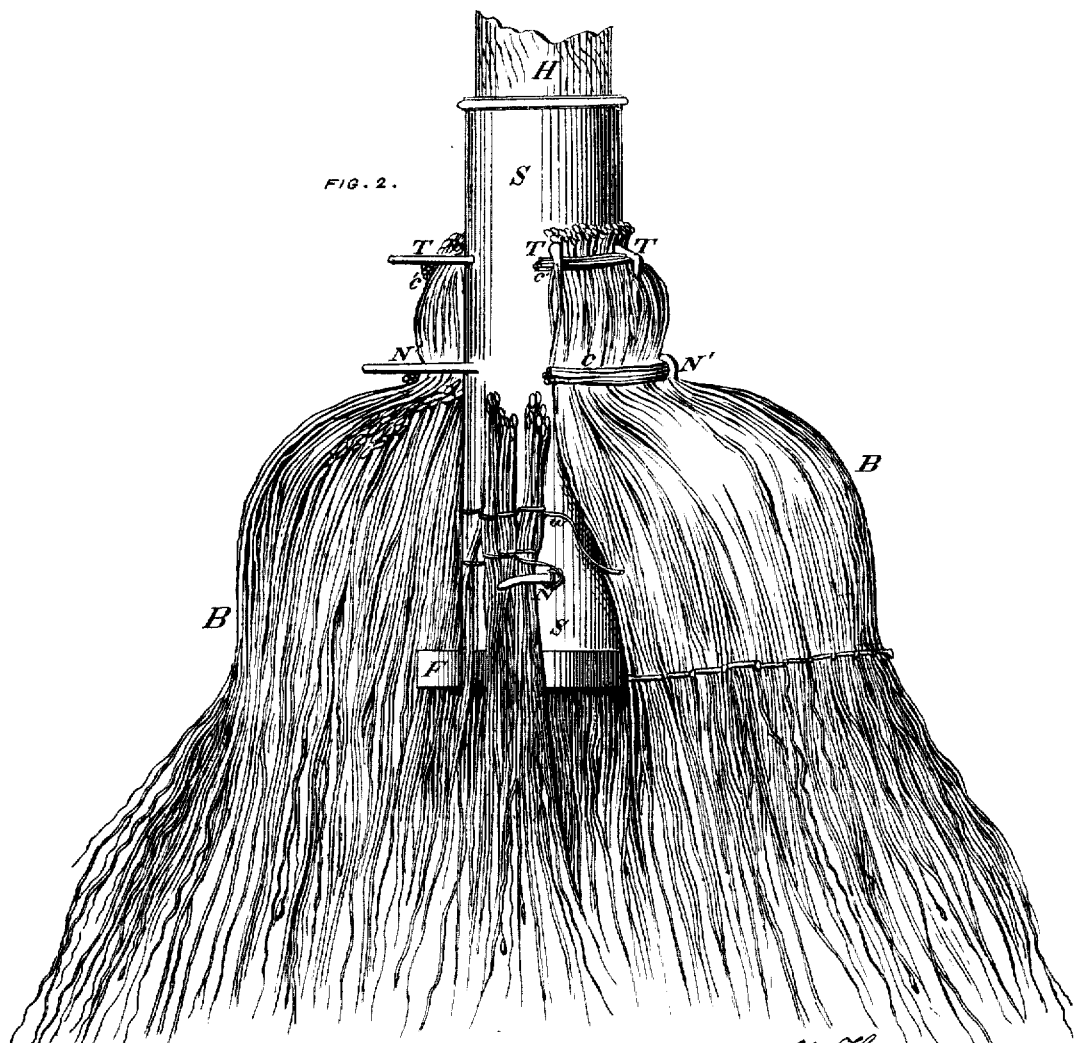

UNITED STATES PATENT OFFICE.

HENRY ANDERSON, OF SAN FRANCISCO, AND JAMES F. HOUGHTON, OF SACRAMENTO; SAID HOUGHTON ASSIGNOR TO SAID ANDERSON, AND SAID ANDERSON ASSIGNOR OF ONE-HALF HIS RIGHT TO JOHN B. ROBINSON, OF VALLEJO, CALIFORNIA.

IMPROVEMENT IN BROOM-HANDLE SOCKETS.

Specification forming part of Letters Patent No. 148,278, dated March 10, 1874; application filed May 15, 1873.

*To all whom it may concern:*

Be it known that we, HENRY ANDERSON, of the city and county of San Francisco, and JAMES F. HOUGHTON, of the city of Sacramento, State of California, have invented certain Improvements in Broom-Handle Sockets, of which the following is a specification:

Our invention consists essentially of a socket for detachable brooms, made tapering for adjustment by compression onto prepared tapered ends of broom-handles, such socket being also provided with a hole or holes for securing it in position onto an attachment of a broom-machine, top and bottom flanges for strengthening purposes, and loose or fixed nails for ordinary binding-wire to bind the broom-corn; the object of our invention being to make sockets, on which brooms can be manufactured, adjustable to broom-handles especially prepared to receive them, and thus allow of such manufactured brooms and their handles being separately packed for the purpose of shipment in a much smaller space than that of ordinary brooms at present in use, as well as admit of the replacement of the handles in the event of breakage of the same.

Figure 1 is a perspective view of a socket embodying our invention. Fig. 2 is a view of a portion of a broom, showing the manner in which it is fitted onto a socket embodying our invention.

With reference to Figs. 1 and 2, S S is the socket embodying our invention, which is constructed of sheet tin, zinc, iron, or any suitable material, and is made of a taper form, so as to fit by compression onto an ordinary broom-handle, H, that has been tapered at one end expressly to receive it, and is held tightly in place by the adhesion of the tapered parts thus forcibly brought into contact. On the periphery of this socket, nails N N' T stick outward, either fastened to it or placed loosely into holes especially provided, so as to allow of the attachment thereto of binding-wire, *w*, for securing broom-corn sprigs in their place during the construction of a broom. At the bottom of the socket a rim or flange, F, is made, which may be provided with wings W W', for giving a better shape to the broom B, manufactured thereon by spreading out the broom-corn; and at the top another rim, R, is formed by simply doubling over the material, so as to strengthen this part and prevent breakage when the tapered end of a broom-handle is driven in. At convenient places on the socket a hole or holes, *h*, are provided, for fixing it onto a taper mandrel with sliding spring attachment fitted to a broom-machine.

In manufacturing these detachable brooms, the corn sprigs are placed along this socket S S after the manner usually adopted with wooden handles employed for the same purpose, the socket being held in a broom-machine in place of the wooden handle. The wire *w*, for stringing this corn on, is then secured to the first bottom nail or nails, N, which are turned down over the material thus strung on, as shown in Fig. 2, and so on till the last tier of corn has been arranged in its place, when the nail or nails N', forming the second row, are turned downward toward the flange F, over the first outer finishing wire coil *c*, and buried in the corn sprigs; and, lastly, the third set, T, are treated in a similar manner over the wire coil *c'*, thus completing the broom.

By these arrangements broom-handles and brooms thus prepared with these socket attachments can be separately stowed away without fear of breakage, in a much smaller space than that occupied by brooms in general use; also, when a broom has its handle broken, it is not necessary to throw away the whole broom, as is now generally the case, but simply to release the broken handle and adjust a fresh one, as previously explained, and the broom is then as serviceable as before.

We do not claim the mode of attachment of the broom-corn sprigs by the wire *w*, nor do we claim all kinds of socket, as we are aware that the introduction of a socket on a ferrule to a broom is not new; but

We claim as our invention—

The tapering socket S S, provided with a flange, F, rim R, loose or fixed nails or pins N N' T, and a hole or holes, *h*, as described, in combination with a broom, B, and binding-wire *w*, substantially as and for the purpose specified.

HENRY ANDERSON.
JAMES F. HOUGHTON.

Witnesses:
ALFRED C. CRANE,
A. C. FREEMAN.